Feb. 19, 1924.

B. WOLHAUPTER 1,484,541

METHOD AND MACHINE FOR MAKING STEP JOINTS

Filed Oct. 6, 1921      6 Sheets-Sheet 1

Inventor
B. Wolhaupter

Witnesses:

Attorney

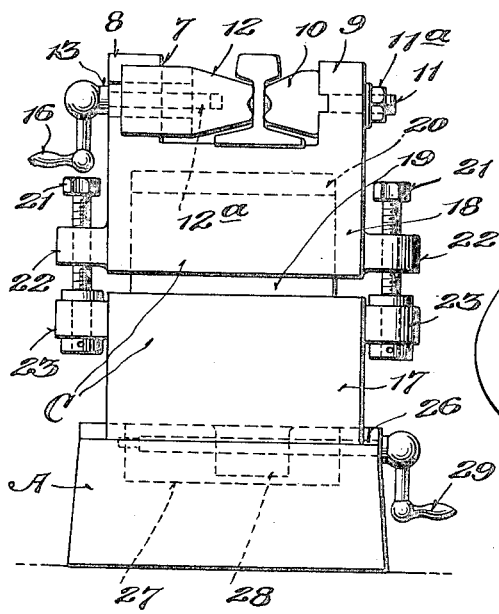
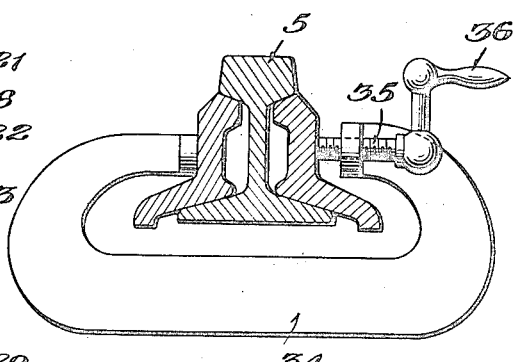
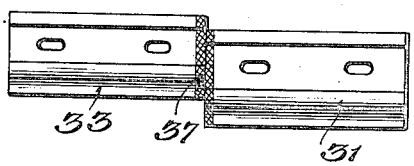
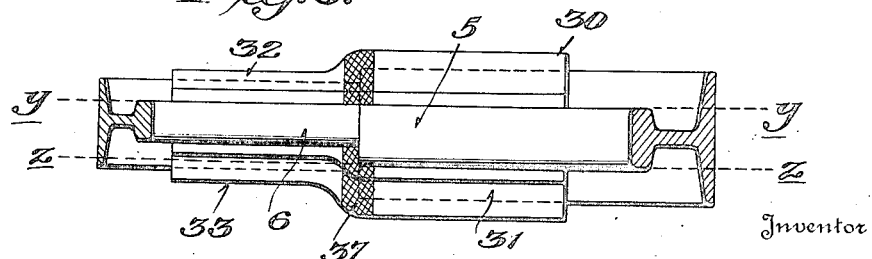

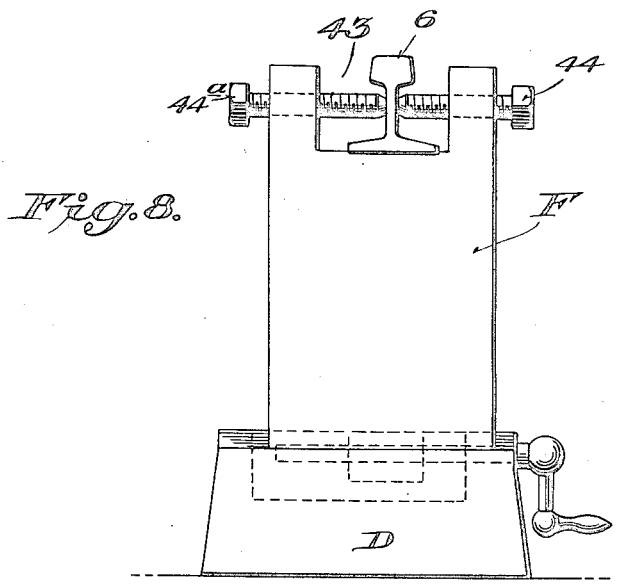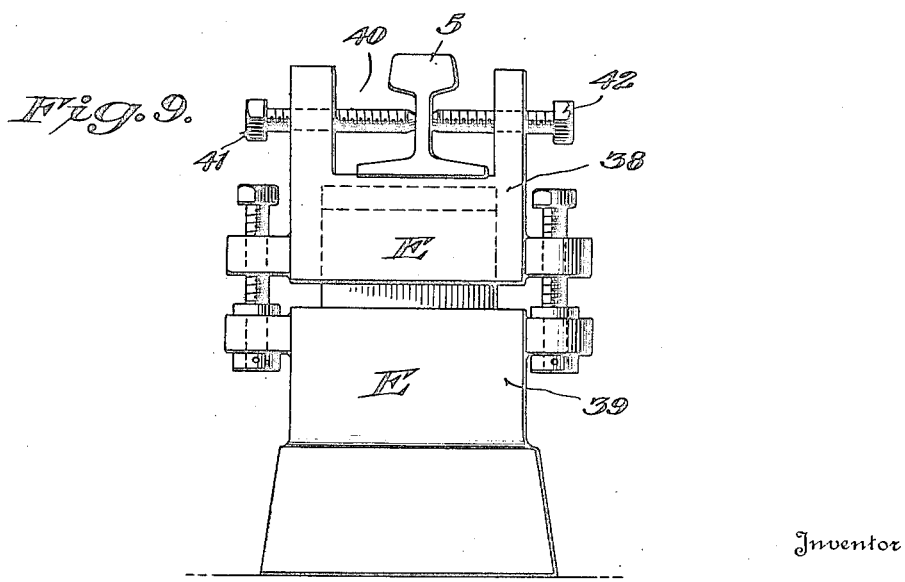

Feb. 19, 1924.
B. WOLHAUPTER
METHOD AND MACHINE FOR MAKING STEP JOINTS
Filed Oct. 6, 1921    6 Sheets-Sheet 5

1,484,541

Witnesses:—
Chas. L. Griesbauer
Emory L. Graff

Inventor
B. Wolhaupter
By
Attorney

Patented Feb. 19, 1924.

1,484,541

UNITED STATES PATENT OFFICE.

BENJAMIN WOLHAUPTER, OF NEW ROCHELLE, NEW YORK, ASSIGNOR TO THE RAIL JOINT COMPANY, OF NEW YORK, N. Y., A CORPORATION OF NEW YORK.

METHOD AND MACHINE FOR MAKING STEP JOINTS.

Application filed October 6, 1921. Serial No. 505,853.

*To all whom it may concern:*

Be it known that I, BENJAMIN WOLHAUPTER, a citizen of the United States, residing at New Rochelle, in the county of Westchester and State of New York, have invented certain new and useful Improvement in Methods and Machines for Making Step Joints, of which the following is a specification.

This invention relates to a new and useful process and apparatus for manufacturing rail step-joint bars commercially.

In railway installations it is frequently required to join rails which differ in their cross-sectional sizes, such as for instance, a 100-pound rail and a 80-pound rail. These joints are known as "step-joints." Inasmuch as the surface and gauge alignments of the two unequal sized rails must be maintained, irregularly shaped fish plates or splice bars must be employed. On account of the difference of size of the two rails which these step joints are intended to connect, and that the gauge side of the two rails supported by one step joint is on the opposite side to the gauge side of the other two rails supported by the opposite step joint, all step joints must be made in pairs—"rights" and "lefts." These plates or bars have been manufactured heretofore by forging or by casting, and each of these methods is objectionable owing to the large number of combinations of rails of different sizes, with the required number of corresponding dies, patterns, molds, etc.

The principal object of my invention is to provide a process and an apparatus for use in carrying out the process, for manufacturing on a commercial basis, rail joint step bars of various combinations of sizes, from half length plates of standard construction, wherein the meeting edges of each pair of plates are welded to form an integral bar.

Another object of my invention is to provide an apparatus for supporting a pair of rail-shaped dies in proper stepped relation whereby rail step joint bars, both "rights" and "lefts" may be easily and quickly manufactured.

Another object of the invention is to provide means for supporting these dies whereby one may be adjusted relative to the other in order to obtain the necessary surface and gauge alignments for the joint bars.

Another important object of the invention is to provide means for temporarily holding a plurality of half length plates in proper position relative to the previously adjusted dies whereby the completed rail step joint bars may be readily removed subsequent to the welding of the meeting ends of said plates.

In the drawings which illustrate several forms of apparatus for carrying out my process, Figure 1 is a front elevation of such an apparatus.

Figure 3 is a similar view showing the left-hand end of the apparatus.

Figure 4 is a plan view showing one of the completed rail step joint bars.

Figure 5 is a detail sectional view taken on the line 5—5 of Figure 1, showing the removable clamp for holding a pair of plates against the die.

Figure 6 is a detail plan view showing the dies properly adjusted and the half length plates properly positioned relative to the dies and welded together.

Figure 8 is an elevation showing the left-hand end of said apparatus.

Figure 9 is a similar view showing the right-hand end of said apparatus.

Like reference numerals designate corresponding parts in all of the figures of the drawings.

Figure 1:
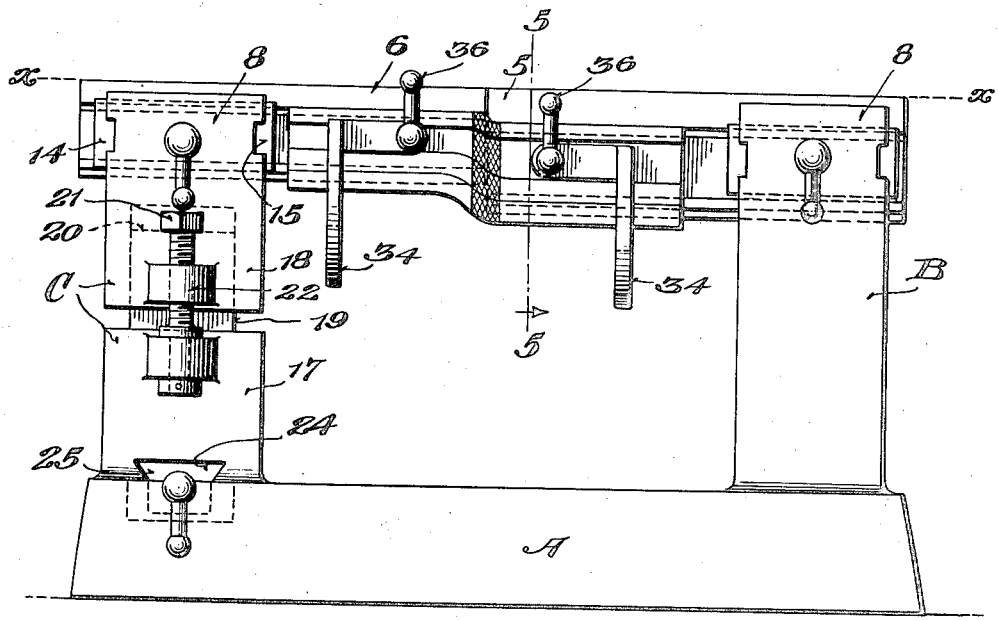

In order to manufacture rail step joint bars on a commercial basis, it is necessary to employ rail-shaped dies of various combinations and sizes, to meet the requirements of track installations. It is also necessary to position any pair of these dies in the same manner as the rails on which the step bars are to be arranged would be positioned. To this end it is necessary to position these dies in surface and gauge alignments.

In order to avoid the expense of making the large number of rail-shaped dies, I utilize rail sections for the dies. These rail sections are supported on an apparatus and means are provided whereby the sections or dies may be relatively adjusted so as to bring about the proper surface and gauge alignments. Half length plates are then fished into position so that their meeting edges are disposed in the plane of the meeting edges of the dies. These plates are temporarily held in place by clamps and after the meeting edges of the plates have been welded, the clamps are loosened and the rail step joint bars, which have thus been formed from the welded plates, are then removed from the dies.

In carrying out my improved process, any suitable form of apparatus may be employed. I have illustrated several forms of such apparatus and in Figures 1, 2, and 3, I have shown an apparatus which embodies a supporting structure consisting of a base A, a fixed standard B, and an adjustable standard C for respectively supporting the rail-dies 5 and 6, the die 5 being shown as the larger.

In order to removably support these dies, the standards are respectively formed in their upper ends with recesses 7 for receiving the dies. Each recess forms resultant upstanding front and rear ears 8 and 9. A rear clamping block 10 is provided with a threaded shank 11 which passes through a suitable opening in the rear ear 9 and a nut 11ª engageable with said shank clamps the block 10 to the ear 9. To permit the rail die to be changed for different "steps"—the front clamping block 12, must be made adjustable. This block is therefore provided with guide arms 14 and 15 which have tongue and groove connections with the sides of the ear 8. A screw 13 journaled in the ear 8 passes into a threaded hole 12ª in the clamping block 12. The screw 13 is provided with a handle 16. By revolving the latter, the clamping block 12 is moved backward and forward. The dissimilar rail-dies 5 and 6 are respectively placed in position between the clamping blocks 10 and 12, and the handles 16 are then operated to move the clamping blocks 12 rearwardly so as to clamp said dies between the clamping blocks 10 and 12.

Figure 2:
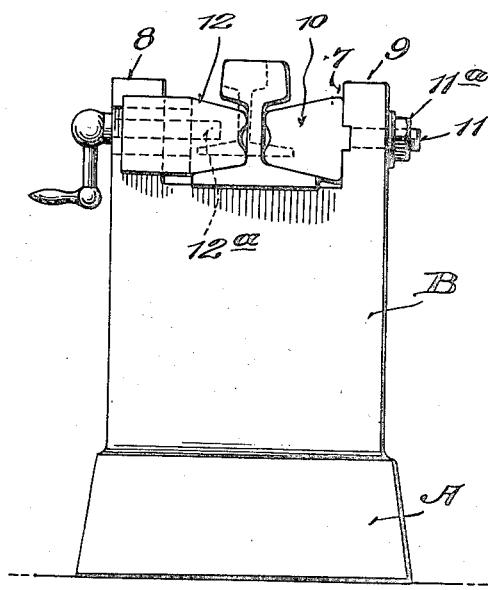
Figure 2 is an elevation showing the right-hand end of the apparatus.

After these dies have been thus positioned on the supporting structure, it is desirable to align said dies so as to bring the same to surface and gauge alignments. To this end I have mounted the standard C on the base A so as to permit said standard to be moved laterally, that is, forwardly or backwardly, and I have also formed the standard C of two parts or sections whereby the upper section which carries the die may be adjusted vertically. As shown in Figures 1 and 3, the standard C embodies a lower section 17 and an upper section 18. The lower section carries an upwardly extending guide tongue 19 which is closely fitted within and has slidable engagement with a recess 20 formed in the upper section 18. Screws 21, 21 which are threaded into lugs 22, 22 carried by the upper section 18, have their lower ends held against vertical movement in lugs 23, 23 carried by the lower section 17. Thus, by movement of the screws 21, the upper section 18 will be moved vertically so as to bring the die carried thereby into surface alignment with the other die, as shown by the line X—X in Figure 1.

The lower section 17 of the standard C is formed with a dovetailed groove 24 in its base for receiving a correspondingly shaped rib 25 formed on the base A. This rib extends rearwardly and consequently the standard C may be moved forwardly or backwardly. In order to make this adjustment, I have provided a screw shaft 26 which is journaled in the base A and held against longitudinal movement. This screw shaft extends rearwardly into a recess 27 formed in the base A and has threaded engagement with a lug 28 which projects from the lower section 17 of the upright of the standard C into the recess 27. A handle 29 is fixed to the screw shaft 26 and upon rotation of this handle the screw shaft will, through the medium of the lug 28, cause the standard C to be moved rearwardly or forwardly in order to bring the dies into either gauge alignment shown by lines Y—Y and Z—Z in Figure 6.

From the above, it will be seen that I have provided a support for the dies and also means for relatively adjusting the dies in planes at right angles whereby surface and gauge alignments of the dies may be obtained.

After the dissimilar rail-dies have been thus properly positioned, I then fish a pair of half length plates 30, 31 of standard construction to the end of the rail-die 5 and a pair of half length plates 32, 33 to the end of the rail-die 6. These plates are of the proper sizes to fit the respective rail-dies.

The adjacent ends of the plates 30 and 32 and the adjacent ends of the plates 31 and 33 are positioned in substantial alignment with the meeting ends of the rail-dies. It will be noted from an inspection of Figure 6 that owing to the difference in sizes of the rail-dies, the plates 32 and 33 are offset laterally relative to the plates 30 and 31, the plate 33 being farther offset from the plate 31 than the plate 32 is offset from the plate 30, owing to the rail-die 6 being moved to gauge alignment on the line Y—Y.

Each pair of plates 30, 31 and 32, 33 is temporarily supported in the correct stepped relation to the dissimilar rail-dies as described above, by means of a clamp 34 which is preferably U-shaped in elevation so as to partially embrace the rail-die and oppositely positioned plates, as illustrated in Figure 5. Each clamp is provided with a clamping screw 35 having an operating handle 36 which, when operated, causes the plates to be firmly supported in correct positions. These clamps are quick acting and consequently the plates can be positioned and removed in very short periods of time.

As soon as the plates have been properly supported, the meeting ends thereof are then joined by the process of electric or oxy-acetylene welding as may be desired, as indicated at 37 in Figures 4 and 6. Thus, the welding of the half length plates produces rail step joint bars from commercial stock parts. One of the completed bars is illustrated in Figure 4. After these bars have been thus produced, the clamps 34 are quickly detached and the bars are then withdrawn.

The bars produced on that side of the rail-dies adjacent the gauge line Y—Y are known as "rights" and those bars which are produced on the opposite side of the rail-dies adjacent the gauge line 27 are known as "lefts". It is obvious that either a series of "rights" or "lefts" may be produced.

Figure 7:
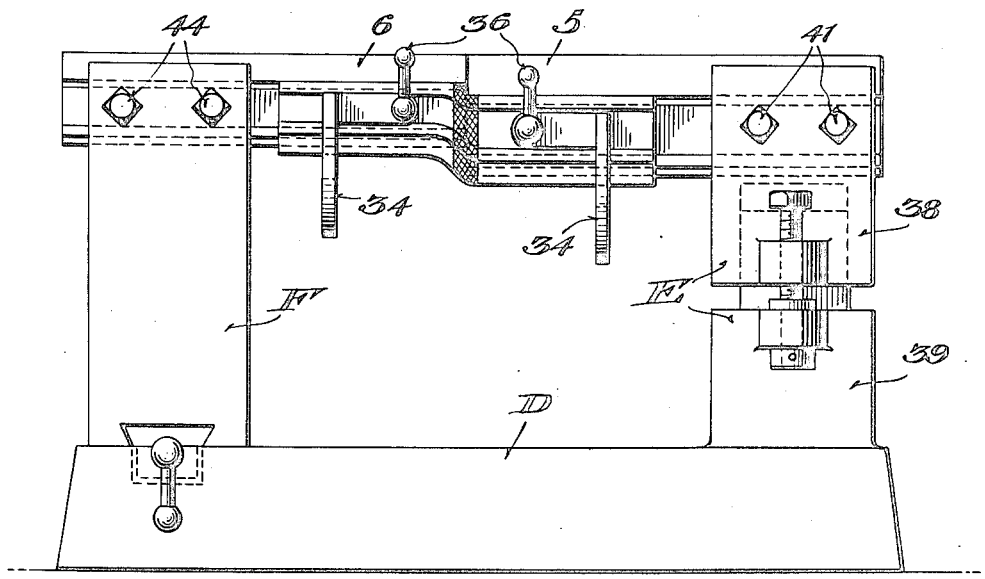
Figure 7 is a front elevation showing another form of apparatus for carrying out my process.
Figure 10:
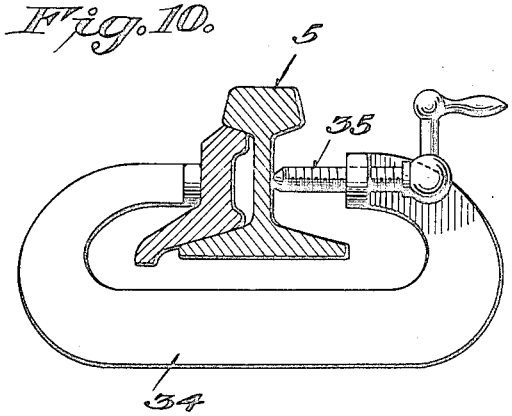
Figure 10 is a detail sectional view showing a single half length plate held in proper position relative to one of the dies.

In the apparatus illustrated in Figures 7, 8 and 9, the adjustments for the rail dies are divided, that is, one standard is movable vertically to bring the rail-dies into surface alignment and the other standard is movable horizontally to bring the rail-dies into gauge alignment. In this form, the base D supports standards E and F. The standard E is formed of upper and lower sections 38 and 39. The lower section 39 is fixed to the base and the upper section 38 is mounted for vertical adjustment by the same character of means employed with the standard C.

It is therefore thought that a repetition of the description of this specific means is unnecessary. In either form of apparatus the rail-die 5 may be clamped in the recess 40 of the upper section 38 of the standard E by means of oppositely disposed pairs of clamping bolts 41 and 42. The standard F is supported on the base D for lateral movements, i. e., backwards or forwards, by the same character of means employed in connection with standard C and a repetition of a specific description of said means is thought to be unnecessary. The rail-die 6 is clamped in the recess 43 formed in the upper end of the standard F by means of oppositely disposed pairs of clamping bolts 44 and 44ᵃ.

It will thus be seen that the rail-dies 5 and 6 may be independently adjusted in order to bring about surface and gauge alignments between said dies. It will also be noted that these dies are adjustable in planes at right angles one to the other so as to bring about said surface and gauge alignments.

Figure 11:
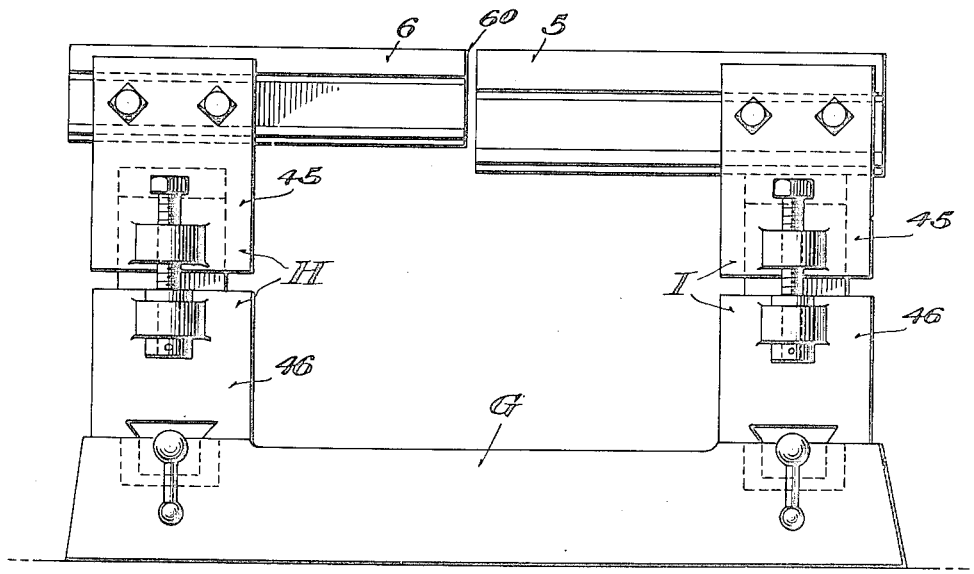
Figure 11 is a front elevation of another form of apparatus for carrying out my process.
Figure 13:
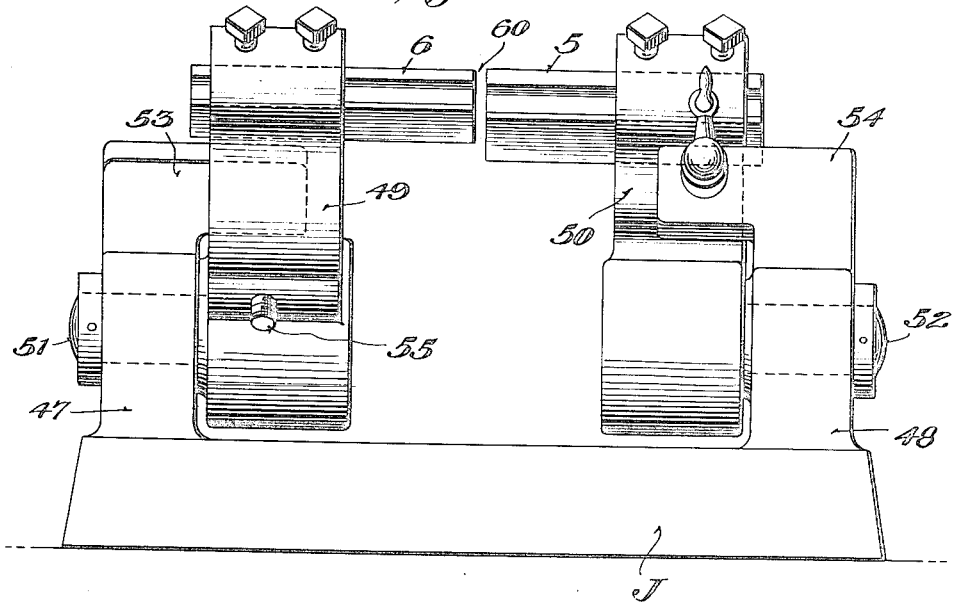
Figure 13 is a front elevation showing another type of apparatus for carrying out my invention.

When it is desired to manufacture a series of either "rights" or "lefts" and weld the inner portion where the two half length plates meet, I preferably space the rail-dies 5 and 6 a considerable distance apart as shown at 60 in Figures 11 and 13 so as to provide access to the welding point.

Figure 12:
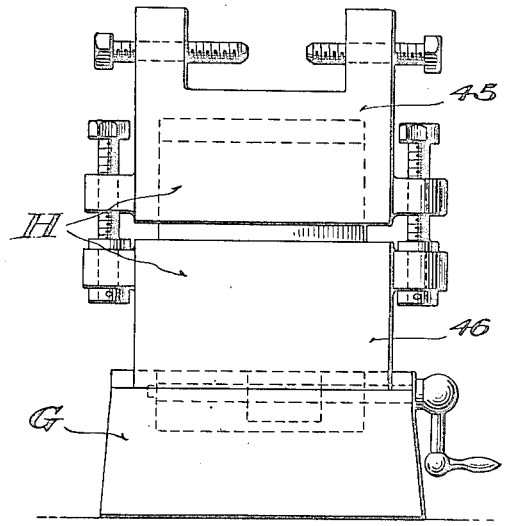
Figure 12 is an elevation showing the end of said apparatus.

In the apparatus illustrated in Figures 11 and 12, the base G supports spaced standards H and I. Each standard is mounted for lateral movement, i. e., backwards or forwards, and each standard is divided into upper and lower sections, the upper section being vertically adjustable. In other words, each rail-die is capable of being vertically and horizontally adjusted. This arrangement creates a more flexible apparatus as it enables a much larger vertical adjustment of the dies and also a much larger horizontal adjustment of the dies. Each standard consists of upper and lower sections 45 and 46 and the upper section is supported on the lower section for vertical movements, by the same character of means as is employed with the standard C. It is therefore thought that a repetition of the description of the specific means is unnecessary. The rail-dies 5 and 6 are supported on the upper ends of the upper sections 45 by the same means employed in supporting the dies in Figure 7 and a repetition of the description of this supporting means is thought to be unnecessary. The standards H and I are each supported on the base G for lateral adjustments by the same character of means as is employed in connection with the standard C and therefore a repetition of the specific description of this adjusting means is thought to be unnecessary.

Figure 14:
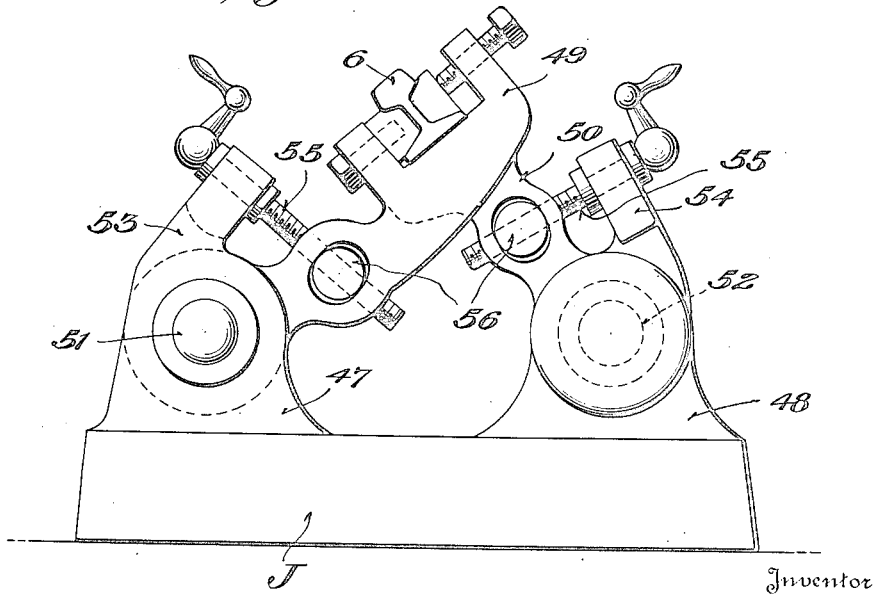
Figure 14 is an end elevation thereof.

In the apparatus illustrated in Figures 13 and 14, I have provided a base J having a pair of spaced bearing lugs 47 and 48 extending upwardly therefrom and disposed on opposite sides of the central longitudinal plane of the base. Rail-die supporting arms 49, 50 are respectively journaled on the bearing lugs 47, 48 by means of gudgeons 51, 52. The axes of these gudgeons are disposed in parallel relation so that the pivoted arms 49 and 50 may be swung toward and away from one another. Formed in the upper portion of each of said arms is a recess for receiving the respective rail-die, and each rail-die is suitably clamped to the supporting arm by means similar to that shown in Figures 7 and 8, and therefore, a further description of the specific clamping or supporting means is thought to be unnecessary. In order to swing the supporting arms 49 and 50 and hold the same in any adjusted position I have provided the lugs 47 and 48 with extensions 53 and 54 respectively. Screw shafts 55, 55 are respectively journaled in said extensions and have threaded engagement with nuts 56 which are respectively supported for rotation and sliding movement in the arms 49 and 50. These rotatable nuts are employed to prevent any binding action when the arms 49 and 50 are adjusted at the time the screws 55 are rotated. By adjusting the arms 49 and 50 either upwardly or downwardly by means of the screw shafts 55, the rail dies may be brought into surface and gauge alignments. The rail-dies are located at such distances from the pivots 51 and 52 that the arcuate paths traversed by said dies will be substantially at right angles to one another and thus the path of one die will make for the adjustment for "gauge" and the path of the other die will make for the adjustment of "surface" of the proposed step joint.

I claim:

1. A process of making step rail joint bars which consists in temporarily supporting a pair of half length plates in correct stepped relation to dissimilar rail-shaped dies, then welding the adjacent ends of said plates, and subsequently removing the completed bar from its support.

2. A process of making step rail joint bars which consists in aligning a pair of dissimilar supporting dies, then temporarily fishing a half length plate to each of said dies, then welding the adjacent ends of said plates, and subsequently removing the completed bar from its supporting dies.

3. A process of making step rail joint bars which consists in bringing a pair of dissimilar rail-shaped dies to surface and gauge alignment, then temporarily fishing a half length plate to each of said dies, then welding the adjacent ends of said plates, and subsequently removing the completed bar from said dies.

4. In an apparatus for making rail step joint bars, a supporting structure, and a pair of dissimilar rail-dies mounted thereon.

5. In an apparatus for making rail step joint bars, a supporting structure, a pair of dissimilar rail-dies mounted thereon, and means for relatively adjusting said rail-dies, whereby the same may be brought to surface alignment.

6. In an apparatus for making rail step joint bars, a supporting structure, a pair of dissimilar rail-dies mounted thereon, and means for relatively adjusting said rail-dies, whereby the same may be brought to gauge alignment.

7. In an apparatus for making rail step joint bars, a supporting structure, a pair of dissimilar rail-dies mounted thereon, and means for relatively adjusting said rail-dies, whereby the same may be brought to surface and gauge alignments.

8. In an apparatus for making rail step joint bars, a supporting structure, a pair of dissimilar rail-dies mounted thereon, and means for relatively adjusting said rail dies in planes at right angles to one another whereby the same may be brought to surface and gauge alignments.

9. In an apparatus for making rail step joint bars, a supporting structure, a pair of dissimilar rail-dies mounted thereon, and means for temporarily supporting a pair of half length plates positioned in fishing relation on said dies.

10. In an apparatus for making rail step joint bars, a supporting structure, a pair of dissimilar rail-dies mounted thereon, and means cooperating with said dies for temporarily supporting a pair of half length plates positioned in fishing relation on said dies.

11. In an apparatus for making rail step joint bars, a supporting structure, a pair of dissimilar rail-dies mounted thereon, and removable clamps for temporarily supporting a pair of half length plates positioned in fishing relation on said dies.

12. In an apparatus for making rail step joint bars, a supporting structure, a pair of dissimilar rail-dies mounted thereon, means for relatively adjusting said rail-dies, whereby the same may be brought to surface alignment, and means for temporarily supporting a pair of half length plates positioned in fishing relation on said dies.

13. In an apparatus for making rail step joint bars, a supporting structure, a pair of dissimilar rail-dies mounted thereon, means for relatively adjusting said rail-dies, whereby the same may be brought to gauge alignment, and means for temporarily supporting a pair of half length plates positioned in fishing relation on said dies.

14. In an apparatus for making rail step joint bars, a supporting structure, a pair of dissimilar rail-dies mounted thereon, means for relatively adjusting said rail-dies whereby the same may be brought to surface and gauge alignments, and means for temporarily supporting a pair of half length plates positioned in fishing relation on said dies.

15. In an apparatus for making rail step joint bars, a supporting structure, a pair of dissimilar rail-dies mounted thereon, means for relatively adjusting said dies in planes at right angles to one another whereby the same may be brought to surface and gauge alignments, and means for temporarily supporting a pair of half length plates positioned in fishing relation on said dies.

16. In an apparatus for making rail step joint bars, a supporting structure, a pair of dissimilar rail-dies mounted thereon, means for relatively adjusting said dies in planes at right angles to one another whereby the same may be brought to surface and gauge alignments, and removable clamps for temporarily supporting a pair of half length plates positioned in fishing relation on said dies.

17. In an apparatus for making rail step joint bars, the combination of a supporting structure comprising a base, a pair of standards mounted thereon, and a pair of dissimilar rail-dies respectively supported on said standards.

18. In an apparatus for making rail step joint bars, the combination of a supporting structure comprising a base, a pair of standards mounted thereon, a pair of dissimilar rail-dies respectively supported on said standards, and means for relatively adjusting said standards whereby said rail-dies may be brought into surface alignment.

19. In an apparatus for making rail step joint bars, the combination of a supporting structure comprising a base, a pair of standards mounted thereon, a pair of dissimilar rail-dies respectively supported on said standards, and means for relatively adjusting said standards whereby said rail-dies may be brought into gauge alinement.

20. In an apparatus for making rail step joint bars, the combination of a supporting structure comprising a base, a pair of standards mounted thereon, a pair of dissimilar rail-dies respectively supported on said standards, and means for relatively adjusting said standards whereby said rail-dies may be brought into surface and gauge alignments.

21. In an apparatus for making rail step joint bars, the combination of a supporting structure comprising a base, a pair of standards mounted thereon, a pair of dissimilar rail-dies respectively supported on said standards, and means for relatively adjusting said standards in planes at right angles to one another whereby said rail-dies may be brought to surface and gauge alignments.

22. In an apparatus for making rail step joint bars, the combination of a supporting structure comprising a base, a pair of standards mounted thereon, a pair of dissimilar rail-dies respectively supported on said standards, and means for temporarily supporting a pair of half length plates positioned in fishing relation on said dies.

23. In an apparatus for making rail step joint bars, the combination of a supporting structure comprising a base, a pair of standards mounted thereon, a pair of dissimilar rail-dies respectively supported on said standards, and removable clamps for temporarily supporting a pair of half length plates positioned in fishing relation on said dies.

24. In an apparatus for making rail step joint bars, the combination of a supporting structure comprising a base, a pair of standards mounted thereon, a pair of dissimilar rail-dies respectively supported on said standards, means for relatively adjusting said standards whereby said rail-dies may be brought into surface alignment, and means for temporarily supporting a pair of half length plates positioned in fishing relation on said dies.

25. In an apparatus for making rail step joint bars, the combination of a supporting structure comprising a base, a pair of standards mounted thereon, a pair of dissimilar rail-dies respectively supported on said standards, means for relatively adjusting said standards whereby said rail-dies may be brought into surface alignment, and removable clamps for temporarily supporting a pair of half length plates positioned in fishing relation on said dies.

26. In an apparatus for making rail step joint bars, the combination of a supporting structure comprising a base, a pair of standards mounted thereon, and a pair of dissimilar rail-dies respectively supported on said standards, one of said standards having an adjustable connection with said base whereby said standard may be moved laterally to bring the rail-dies to gauge alignment.

27. In an apparatus for making rail step joint bars, the combination of a supporting structure comprising a base, a pair of standards mounted thereon, a pair of dissimilar rail-dies respectively supported on said standards, one of said standards having an adjustable connection with said base whereby said standard may be moved laterally to bring the rail-dies to gauge alignment, and means for adjusting said standard laterally.

28. In an apparatus for making rail step joint bars, the combination of a supporting structure comprising a base, a pair of standards mounted thereon, and a pair of dissimilar rail-dies respectively supported on said standards, one of said standards having a vertically adjustable upper section for supporting one of the rail-dies whereby said die may be brought to surface alignment with the other die.

29. In an apparatus for making rail step joint bars, the combination of a supporting structure comprising a base, a pair of standards mounted thereon, a pair of dissimilar rail-dies respectively supported on said standards, one of said standards having a vertically adjustable upper section for supporting one of the rail dies whereby said die may be brought to surface alignment with the other die, and means for vertically adjusting said upper section.

30. In an apparatus for making rail step joint bars, the combination of a supporting structure comprising a base, a pair of standards mounted thereon, and a pair of dissimilar rail-dies respectively supported on said standards, one of said standards having an adjustable connection with said base whereby said standard may be moved laterally to bring the rail-die supported thereon to gauge alignment with the other die, said standard having a vertically adjustable upper section for supporting the rail-die whereby said die may be brought to surface alignment with the other die.

31. In an apparatus for making rail step joint bars, the combination of a supporting structure comprising a base, a pair of standards mounted thereon, a pair of dissimilar rail-dies respectively supported on said standards, one of said standards having an adjustable connection with said base whereby said standard may be moved laterally to bring the rail-die supported thereon to gauge alignment with the other die, means for adjusting said standard laterally, said standard having a vertically adjustable upper section for supporting the rail-die whereby said die may be brought to surface alignment with the other die, and means for vertically adjusting the upper section of said standard.

32. In an apparatus for making rail step joint bars, the combination of a supporting structure comprising a base, a pair of standards mounted thereon, a pair of dissimilar rail dies respectively supported on said standards, one of said standards having an adjustable connection with said base whereby said standard may be moved laterally to bring the rail-die supported thereon to gauge alignment with the other die, said standard having a vertically adjustable upper section for supporting the rail-die whereby said die may be brought to surface alignment with the other die, and means for temporarily supporting a pair of half length plates positioned in fishing relation on said dies.

33. In an apparatus for making rail step joint bars, the combination of a supporting structure comprising a base, a pair of standards mounted thereon, a pair of dissimilar rail-dies respectively supported on said standards, one of said standards having an adjustable connection with said base whereby said standard may be moved laterally to bring the rail-die supported thereon to gauge alignment with the other die, said standard having a vertically adjustable upper section for supporting the rail-die whereby said die may be brought to surface alignment with the other die, and removable clamps for temporarily supporting a pair of half length plates positioned in fishing relation on said dies.

34. In an apparatus for making rail step joint bars, a supporting structure, a pair of dissimilar rail-dies mounted thereon, and means for detachably clamping said dies on said standards.

35. In an apparatus for making rail step joint bars, a supporting structure, a pair of dissimilar rail-dies mounted thereon, and means for relatively adjusting said rail-dies in a direction at right angles to one another.

In testimony whereof I hereunto affix my signature.

BENJAMIN WOLHAUPTER.